(12) United States Patent
Sakai et al.

(10) Patent No.: US 6,763,869 B2
(45) Date of Patent: Jul. 20, 2004

(54) DEVICE FOR PRODUCING THERMOPLASTIC RESIN CONTINUOUS LENGTH SECTIONS REINFORCED WITH LONG FIBERS

(75) Inventors: Yasuhiro Sakai, Ichihara (JP); Rikio Yonaiyama, Ichihara (JP)

(73) Assignee: Chisso Corporation, Osaka (JP)

( * ) Notice: Subject to any disclaimer, the term of this patent is extended or adjusted under 35 U.S.C. 154(b) by 383 days.

(21) Appl. No.: 09/799,582

(22) Filed: Mar. 7, 2001

(65) Prior Publication Data

US 2002/0125603 A1 Sep. 12, 2002

(51) Int. Cl.[7] .............................................. B29C 70/52
(52) U.S. Cl. ...................... 156/441; 156/166; 156/180; 156/433; 264/137; 264/171.13; 264/171.24; 425/113; 425/122
(58) Field of Search ................................. 156/166, 180, 156/433, 441; 425/113, 122; 264/137, 171.13, 171.24

(56) References Cited

U.S. PATENT DOCUMENTS

| | | | |
|---|---|---|---|
| 3,740,304 A | * | 6/1973 | Okumuro et al. ........... 156/180 |
| 4,549,920 A | | 10/1985 | Cogswell et al. |
| 4,559,262 A | | 12/1985 | Cogswell et al. |
| 4,820,366 A | * | 4/1989 | Beever et al. ............... 156/433 |
| 5,019,450 A | | 5/1991 | Cogswell et al. |
| 5,213,889 A | | 5/1993 | Cogswell et al. |
| 5,948,473 A | * | 9/1999 | Saito et al. .................. 156/441 |

* cited by examiner

Primary Examiner—Jeff H. Aftergut
(74) Attorney, Agent, or Firm—McDermott, Will & Emery

(57) ABSTRACT

In a pultrusion device for producing continuous length sections prepared from thermoplastic resins reinforced with long fibers, the vertical angle ($\alpha$) of an upstream conical surface of a conical portion, which constitutes a shaping nozzle perforated through the downstream end wall of the device ranges from 15 to 35 degrees and the shaping nozzle has a land portion having a length of 1 to 5 mm in the downstream area subsequent to the upstream conical surface. According to this pultrusion device for producing continuous length sections prepared from thermoplastic resins reinforced with long fibers, the long fibers never undergo any breakage nor fluffing during the opening treatment and this accordingly leads to the substantial reduction of pill-formation. As a result, the opening-impregnation device of the present invention provided at least with the downstream end wall carrying the shaping nozzle (including the land portion) can stably and continuously be operated over a long period of time, without any trouble such as those encountered in the conventional devices.

4 Claims, 3 Drawing Sheets

DEVICE FOR PRODUCING THERMOPLASTIC RESIN CONTINUOUS LENGTH SECTIONS REINFORCED WITH LONG FIBERS

BACKGROUND OF THE INVENTION

1 Field of the Invention

The present invention relates to a device for producing thermoplastic resin continuous length sections, or a thermoplastic resin structure reinforced with unidirectional aligned long fibers by impregnating continuous reinforcing fiber bundles with a molten thermoplastic resin. More specifically, the present invention pertains to a device for producing thermoplastic resin continuous length sections, which is characterized by the use of a shaping nozzle having a specific shape and which permits not only the inhibition of pill-formation due to fiber breakage, but also highly stable production of the sections.

2 Description of the Prior Art

There have already been proposed a variety of methods (or devices) for satisfactorily impregnating reinforcing fiber bundles with a molten resin, such as those disclosed in, for instance Japanese Examined Patent Publication No. Sho 63-37694. These methods permit the production of thermoplastic resin continuous length sections excellent in the impregnation ability. However, the inventors of this invention have exhaustively investigated these methods and have thus found that they should be improved on the point specified below:

Fibers undergo fiber breakage as the device is operated over a long period of time and this accordingly results in the pill-formation. Moreover, pills thus formed plug the shaping nozzle of the device, this nozzle plugging would lead to further fiber breakage and the continuous length sections are ultimately broken. Thus, the operation of the device must be interrupted.

SUMMARY OF THE INVENTION

Accordingly, it is an object of the present invention to provide a device for producing thermoplastic resin continuous length sections reinforced with long fibers, which can eliminate the foregoing various problems associated with the conventional techniques and which can provide a means for preventing the formation of any pill frequently observed in shaping nozzles positioned at the downstream end of an opening-impregnation device even after the operation thereof over a long period of time.

Another object of the present invention is to provide a device for producing thermoplastic resin continuous length sections reinforced with long fibers, which can thus permit stable production of such continuous length sections over a long period of time.

The inventors of this invention have conducted various studies to solve the foregoing problems associated with the conventional techniques, have found that the use of a shaping nozzle having a specific configuration is quite effective for the solution of the problems and thus have completed the present invention.

According to the present invention, desired effects of the invention can be accomplished by embodiments each comprising any combination of the following characteristic properties:

1) A pultrusion device for producing thermoplastic resin continuous length sections reinforced with long fibers, wherein the vertical angle ($\alpha$) of an upstream conical surface, which constitutes a shaping nozzle perforated through the downstream end wall of the device ranges from 15 to 35 degrees and the shaping nozzle has a land portion having a length of 1 to 5 mm in the downstream area subsequent to the upstream conical surface.

2) The production device as set forth in the foregoing item 1), wherein the vertical angle ($\alpha$) of the upstream conical surface constituting the shaping nozzle ranges from 20 to 30 degrees.

3) The production device as set forth in the foregoing item 1) or 2), wherein the shaping nozzle has a thickness, on the central axis extending from the upstream end to the downstream end of the downstream end wall of the pultrusion device, ranging from 5 to 35 mm.

4) The production device as set forth in any one of the foregoing item 1) to 3), wherein the shaping nozzle has a thickness, on the central axis extending from the upstream end to the downstream end of the downstream end wall of the pultrusion device, ranging from 15 to 30 mm.

BRIEF DESCRIPTION OF THE DRAWINGS

The present invention will hereunder be described in more detail with reference to the accompanying drawings, in which.

DESCRIPTION OF THE PREFERRED EMBODIMENTS

We will hereunder describe in detail the bath-like opening-impregnation device (sometimes referred to as "pultrusion device") and more specifically the shaping nozzle according to the present invention, which is fitted to the pultrusion device, with reference to the accompanying drawings. However, the present invention is not restricted to these specific embodiments at all.

Figure 1:
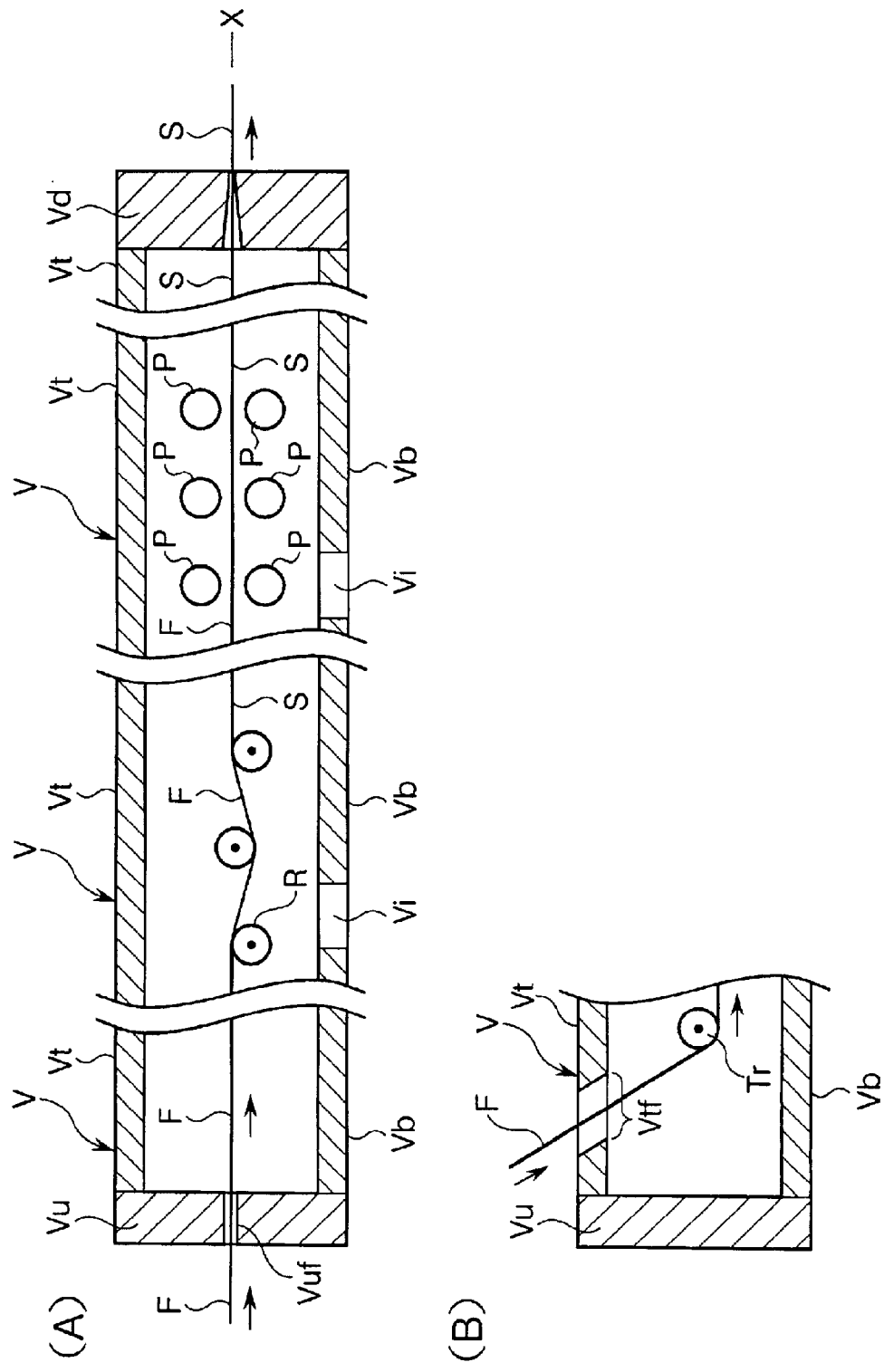
FIG. 1(A) is a longitudinal cross sectional view schematically showing an opening-impregnation device comprising, as a structural element, a downstream end wall equipped with a shaping nozzle therein according to the present invention.
FIG. 1(B) is a partially enlarged longitudinal cross sectional view schematically showing only the portion provided with a port for introducing long fiber bundles formed through a roof on the upstream side.
Figure 2:
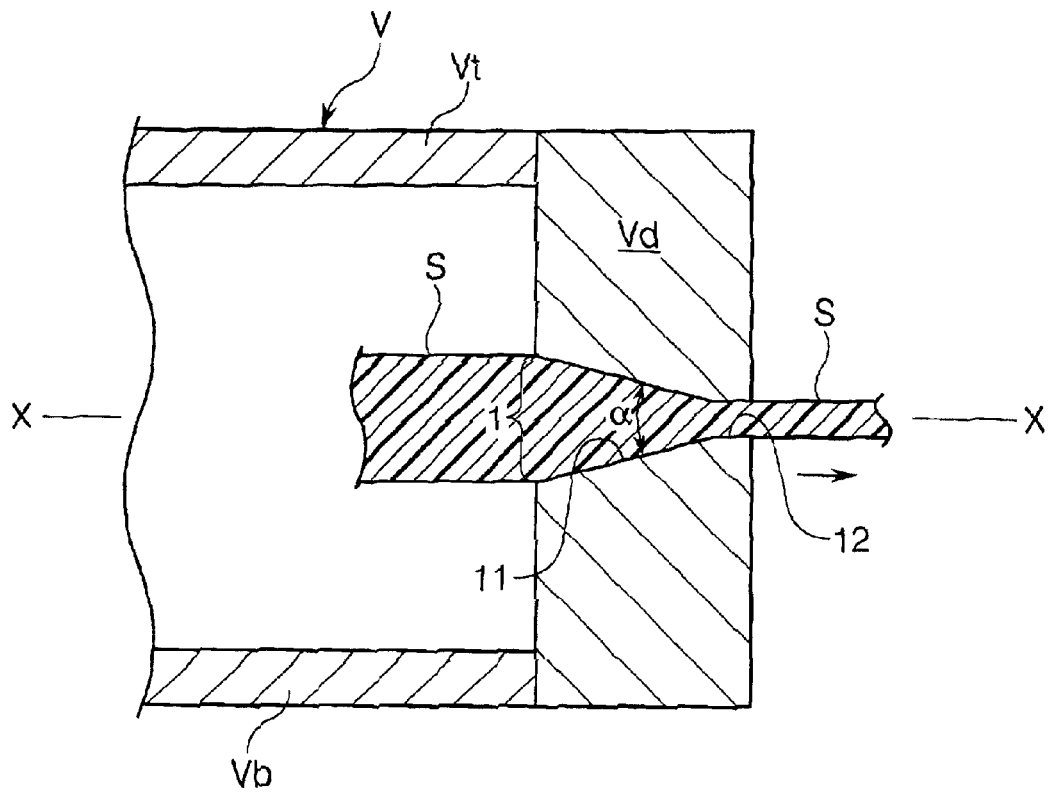
FIG. 2 is an enlarged longitudinal cross sectional view schematically showing a shaping nozzle according to the present invention.
Figure 3:
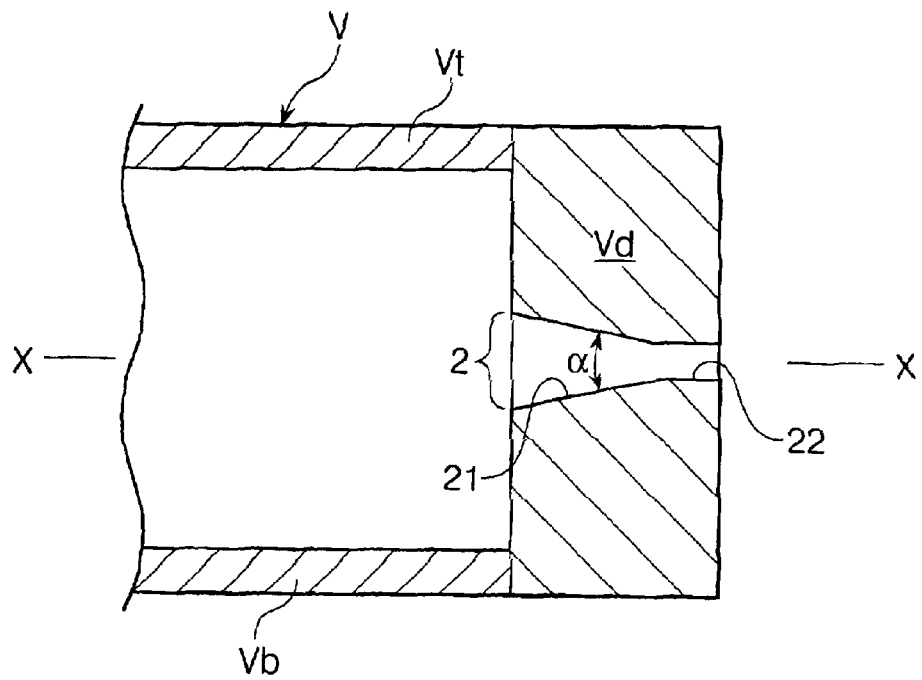
FIG. 3 is a longitudinal cross sectional view schematically showing a shaping nozzle corresponding to Comparative Example 1. In this nozzle, the length of the land portion is set at a value considerably higher than that claimed in the present invention.
Figure 4:
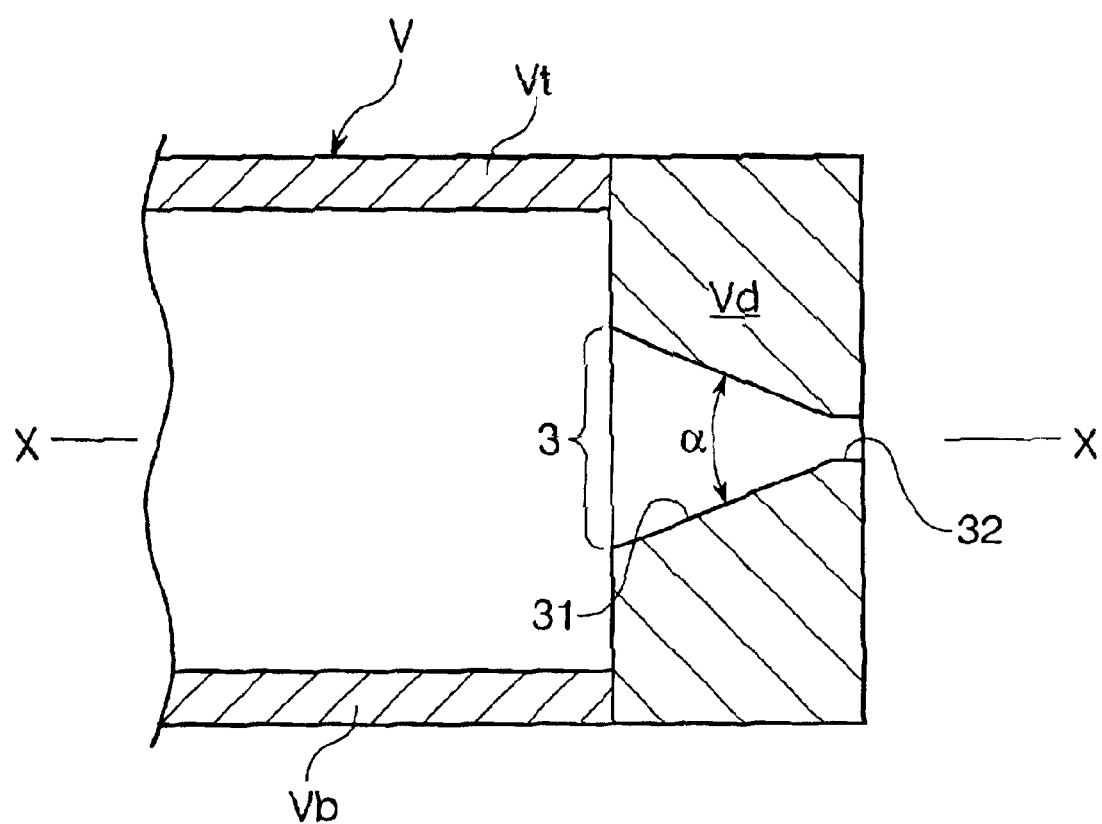
FIG. 4 is a longitudinal cross sectional view schematically showing a shaping nozzle corresponding to Comparative Example 2. In this nozzle, the vertical angle of the conical surface is set at a level substantially greater than that claimed in the present invention.

Referring to the accompanying drawings, FIG. 1 is a diagram used, for convenience, for explaining the present invention and the conventional techniques; FIG. 2 is a diagram used for explaining a preferred embodiment (Example) of the present invention; and FIGS. 3 and 4 are diagrams for explaining similar but out of range embodiments (Comparative Examples).

The preferred embodiment shown in FIG. 1 as a schematic longitudinal cross sectional view is an opening-impregnation device V (also referred to as "pultrusion device") for the production of thermoplastic resin continuous length sections reinforced with long fibers. Referring first to FIG. 1(A), the opening-impregnation device (V; sometimes abbreviated as "opening-impregnation bath" or "impregnation bath") principally comprises a left hand side wall (not shown) and a right hand side wall (not shown) which are positioned in such a manner that they sandwich a long fiber bundle F (long fiber roving) to be opened along the moving direction thereof; an upstream end wall Vu defining the impregnation bath V and positioned at the upstream end of the bath; a downstream end wall Vd defining the impregnation bath V together with the upstream end wall Vu and positioned at the downstream end of the bath; a bottom plate Vb, which is in close contact with all of the right and left side walls and the upstream and downstream end walls at their edges; and a top plate (roof) Vt, which is opposed to the bottom plate Vb and which is in close contact with all of the foregoing walls at their upper edges.

In addition to the foregoing, the impregnation bath V is provided with at least one and preferably at least three opening rolls R (they may be in either idling or drive rotation) or preferably not less than 3 pairs of (fixed: non-rotatable) opening pins P (all of them are sometimes generically referred to as "installed bodies RP for opening"), which are installed at a level, where they are immersed in a molten resin, in such a manner that they can connect the side walls to one another in the interior of the bath and a tapered shaping nozzle 1 according to the present invention, which is perforated through the downstream end wall Vd.

The shaping nozzle 1 according to the present invention is one for arranging the long fiber-reinforced resin continuous length sections S produced in the opening-impregnation bath V in a desired cross sectional shape when drawing out the continuous length sections from the bath. In this respect, the "shaping nozzle" can likewise be referred to as "shaping orifice", but the nozzle is referred to as "shaping nozzle" in the present invention.

FIG. 1(B) is a diagram of the upstream end portion showing another embodiment of an opening-impregnation device V provided with the shaping nozzle 1 according to the present invention. In this embodiment, a long fiber bundle F is introduced into the opening-impregnation device V from the upper left direction towards the obliquely downward direction through the port Vtf for introducing the long fiber bundle to be opened, which is perforated through the top plate of the device V, the long fiber bundle is introduced into a molten resin, then the bundle is brought into contact with a turning means T (a turning roll Tr or a turning pin Tp) from the lower left side thereof, then the bundle is released from the turning means T at a point where the bundle is turned to an approximately horizontal direction and the bundle moves towards the opening roll R or opening pin P. This turning means does not serve to open the long fiber bundle, but simply serves as a means for turning or changing the moving direction of the long fiber bundle F.

EMBODIMENT OF THE PRESENT INVENTION

FIG. 2 is an enlarged longitudinal cross sectional view schematically showing a shaping nozzle 1 according to the present invention. In FIG. 2, the shaping nozzle 1 comprises a conical portion 11 perforated through the downstream end wall Vd in such a manner that it is tapered towards the downstream direction and a land portion 12, which is connected to the downstream end of the conical portion. The wall surface 11i corresponding to the shaping nozzle 1 viewed from the upstream side thereof is in general a conical surface surrounding the central axis (X) of the shaping nozzle 1, but may likewise be an elliptic conical surface or the like (the inner wall surface is in general invisible on the drawing). Both of two straight lines 11m, which converge towards the downstream side on the figures showing the longitudinal cross sectional views of the downstream end wall Vd depicted on the figures including FIG. 2, are generating lines positioned on the inner surface of the conical portion.

In the shaping nozzle 1 according to the present invention, it is sufficient, in most of cases, that the vertical angle [α; the intersectional angle of the foregoing two straight lines 11m] formed by the inner surface 11i of the conical portion 11 in general ranges from 15 to 35 degrees and preferably 20 to 30 degrees. The downstream end of this conical portion 11 is connected to the land portion 12 and this land portion 12 is in general constituted by a cylindrical surface. It is likewise sufficient, in most of cases, that the length of the land portion 12 (land length) usually ranges from 1 to 5 mm and preferably 1 to 3 mm, and the inner diameter of the land portion is practically set at from 1.8 to 4.2 mm, preferably 2 to 3.5 mm.

In the present invention, the thickness of the downstream end wall Vd through which the shaping nozzle 1 according to the present invention is perforated is also an important factor and the thickness in general ranges from 5 to 35 mm and preferably 10 to 30 mm.

Description of the Operations of the Opening-Impregnation Device V

In the opening-impregnation device V (also referred to as "pultrusion device"; "impregnation bath" for short) shown in FIG. 1 through which the shaping nozzle 1 according to the present invention as shown in FIG. 2 is perforated, a long fiber roving F is introduced into the opening-impregnation device V through a port Vuf for introducing long fiber bundles shown on the left hand side of the figure (in the description of this specification, the terms "upper and lower", "left and right", "front and rear", "longitudinal and lateral" or the like are simply expressions as a matter of convenience) or through a port Vt for introducing long fiber bundles on the upper left side of the figure. On the other hand, a molten resin is introduced into the device V from a molten resin-supply mechanism (not shown), which is connected to a molten resin-introduction port Vi which is in general perforated through the bottom plate Vb of the device, through the foregoing port Vi and the molten resin is maintained at a predetermined level.

Molten Resin Introduction Port Vi

The molten resin is supplied to the opening-impregnation bath V through the molten resin supply port Vi fitted to the foregoing impregnation bath. This molten resin introduction port Vi is in general perforated through at least one member selected from the top plate Vt, the bottom plate Vb and the upstream end wall Vu of the impregnation bath (device) V.

Port Vf for Introducing Long Fiber Bundles to be Opened

The fiber bundle F (long fiber bundle) to be opened is introduced into the opening-impregnation bath V through the long fiber bundle introduction port Vf (generic name), as has been discussed above. This long fiber bundle introduction port Vf is perforated through at least one member selected from the upstream end wall Vu and the top plate Vt of the opening-impregnation bath V. The shape of the long fiber bundle introduction port Vf is appropriately selected depending on the site through which the port is perforated. For instance, if the long fiber bundle F (long fiber rovings)

is introduced into the bath V through the long fiber bundle introduction port Vuf perforated through the upstream end wall Vu of the bath, it is sufficient to impart, to the port Vuf, the cross sectional shape of the port per se or to adopt a slit-like shape fitted to the cross sectional shape of a plurality of fiber bundles arranged in a row as the cross sectional shape of the introduction port Vuf.

On the other hand, the long fiber bundle F is introduced into the bath V through the long fiber bundle introduction port Vtf formed through the upstream area of the top plate Vt of the impregnation bath V, the shape of the introduction port Vtf is not restricted to any particular cross sectional shape or the cross sectional shape of the long fiber bundle and may arbitrarily be selected. More specifically, the introduction port Vtf may have not only a shape identical to that of the long fiber bundle introduction port Vuf formed through the upstream end wall Vu, but also other various shapes such as a simple circular shape or a rectangular or square shape, since it is not feared that any molten resin might leak out of the bath through the introduction port Vtf.

Opening-Impregnation Bath and Establishment of the Temperature Thereof

The foregoing "opening-impregnation bath" V is a processing bath used for storing a predetermined amount of the molten resin, while allowing the resin to flow and for impregnating the fibers with the molten resin or for allowing the molten resin to penetrate into the interstices between fibers and it is in general sufficient to use a box-like one as such bath V. However, it is important that the opening-impregnation bath V is at least provided with heating mechanisms (not shown) on the right or left side wall VsLR and on the bottom plate Vb of the bath. The use of such a heating mechanism is preferred since the device can be so designed that the base resin, the long (continuous) fiber bundle F, which is opened and impregnated with the resin, or the like can be heated to a "temperature sufficiently higher" than the melting point of the base resin crystals detailed below or can be maintained at such a desired temperature level. The term "sufficiently high temperature" herein used means a temperature higher than the melting point of the resin crystals used usually by 10 to 150° C., preferably 30 to 120° C. Therefore, the foregoing heating mechanism should have an ability of raising the temperature of the resin and the long fiber bundle F or the like in the impregnation bath V up to such a "sufficiently high temperature" and an ability of keeping such a temperature. In this respect, if the base resin is a combination of at least two thermoplastic resins, the term "sufficiently high temperature" defined above means a temperature higher than the melting point of the resin crystals having the maximum melting point, usually by 10 to 150° C., preferably 30 to 120° C., but if the melting point is reduced depending on the combination, the foregoing "sufficiently high temperature" is defined or calculated on the basis of the new melting point of the combination.

In the foregoing, the term "melting point (Tm) of resin crystals" herein used means a temperature at which a peak is present in the relation between temperature and heat of fusion or the temperature-heat of fusion curve as determined at a heating rate of a sample of 20° C./min in the determination of the heat of fusion using a differential scanning calorimeter (DSC). In this respect, if a plurality of peaks are observed in the temperature-heat of fusion relation, the crystal melting point (Tm) is defined to be a temperature at which a peak occupying a maximum area is present.

A long fiber bundle (rovings) F introduced into the opening-impregnation device V from the upstream side is subjected to opening by at least three installed bodies RP (generic name for "opening rolls" and "opening pins"), which are installed in the device approximately vertical to the moving direction of the molten resin and the resulting opened fiber materials (at least one member selected from single filaments and thinly collected thereof) are simultaneously impregnated (opening-impregnation) with the molten resin. In this case, the methods for opening are roughly classified into two groups.

In the first opening method, opening rolls R are in general used as the at least three installed bodies for opening, they are rotatably (driving or idling) arranged in series along the moving direction of the molten resin, the long fiber bundle F introduced into the opening-impregnation device V is subjected to the opening treatment according to the so-called "zig-zag contact" in which the bundle F repeatedly comes in contact with the circumferential surface of each opening roll R over a predetermined length.

In the second opening method, pairs of opening pins P (a combination of upper opening pins Pu and lower opening pins Pd) usually not less than 3 pairs as the installed bodies for opening, each paired opening pins are installed in such a manner that they are approximately perpendicular to the flow direction of the molten resin and that they vertically sandwich the long fiber rovings F while they do not come in contact with one another, these paired opening pins are arranged in series from the upstream side to the downstream side at intervals of a predetermined distance, the long fiber rovings F introduced into the device V approximately linearly pass through the space between the upper opening pins Pu and the lower opening pins Pd according to the so-called "non-contact" manner in which the long fiber rovings F come in contact with neither of the upper opening pins Pu nor lower opening pins Pd to thus subject the long fiber rovings to opening. In this respect, three pairs of these opening pins are usually arranged within an approximately horizontal plane along the moving direction of the molten resin.

In a practical opening operation, the long fiber rovings F are subjected to an opening operation according to either of the foregoing opening methods and in the impregnation operation, which is performed simultaneously with or slightly after the opening operation, the molten resin is penetrated into gaps among fibrils and each opened fibrous matters and the latter impregnated with the resin is externally drawn, through the shaping nozzle 1, out of the opening-impregnation device V along the downstream direction, while the fibrous matter is squeezed together with the molten resin through the shaping nozzle 1 to thus give long fiber-reinforced continuous length sections S (strands or rods) impregnated with thermoplastic resin.

When the long fiber-reinforced continuous length sections impregnated with thermoplastic resin is drawn through the conventional shaping nozzle 2 or 3, pills are often formed near the outlet of the downstream end wall Vd. These pills are considered to be flocked fiber fragments of "straggling hair", which is formed as a result of the following phenomenon: long fibers broken through the opening treatment are strongly squeezed when passing through the shaping nozzle 1, the broken fibers are removed from the long fiber rovings due to the counteraction of the squeezing action of the nozzle to thus form fluffs, these fluffs are repeatedly bent outwardly when they are drawn through the shaping nozzle 1 and they are relieved from the constriction.

Embodiments Corresponding to Comparative Examples 1 and 2

Referring now to FIG. 3 (Comparative Example 1), there is depicted a shaping nozzle 2 in which the vertical angle (α)

of the conical surface 21 viewed from the upstream side of the nozzle is set at a value identical to that used in the present invention and the length of the land portion 22 connected to the downstream side of the shaping nozzle 2 is set at a value ranging from 6 to 10 mm, which is longer than that claimed in the present invention ranging from 1 to 5 mm. In the opening-impregnation performed using the shaping nozzle 2, pills are quite frequently formed to such an extent that the steady operation of the device is inhibited, the pills being formed due to the fiber breakage of the long fiber-reinforced resin continuous length sections S (long fiber-reinforced strands) and fluffing thereof.

In FIG. 4 (Comparative Example 2), the length of the land portion 32 of the shaping nozzle 3 is identical to that claimed in the present invention, but the vertical angle ($\alpha$) of the conical surface 31 viewed from the upstream side of the nozzle is set at a value of 45 degrees, which is considerably greater than that claimed in the present invention ranging from 15 to 35 degrees. When operating the opening-impregnation device V to which the shaping nozzle 3 is equipped, the fiber breakage and fluffing of the long fiber bundle F introduced into the device V are not caused to such an extent that the steady operation of the device is inhibited, but the frequency of the occurrence thereof and the strength of such phenomena are sufficiently high or severe to reduce the quality of the ultimately obtained products.

Auxiliary Equipments

An extruder is commonly used as a mechanism (not shown) for supplying the molten resin to the foregoing opening-impregnation device V. Various kinds of extruders can be used as such an extruder and examples thereof include a single-screw extruder and a twin-screw extruder. Examples of such twin-screw extruders are further include those in which the screws rotate in the same direction and those in which the screws rotate in different directions as well as those comprising screws having the same length or different lengths, which are appropriately selected depending on the purposes.

Various kinds of equipments such as a cooling installation and/or a sizing die may be fitted to the foregoing opening-impregnation device V on the downstream side of the shaping nozzle 1 formed through the downstream end wall Vd of the device. The cooling installation is fitted to the device for cooling the extruded reinforced strands (rods), while the sizing die is fitted thereto in order to improve the shape, such as the out of roundness, of the reinforced resin continuous length sections S (reinforced strands; reinforced rods). Moreover, a pelletizer (granulation mechanism) or the like may likewise often be fitted to the opening-impregnation device V to thus cut the continuous length sections (the diameter thereof usually ranging from about 1 to 4 mm) into pieces having an average length ranging from 3 to 50 mm and to give granular pieces (pellets).

Long Fiber Reinforcing Material F

Examples of long fiber reinforcing materials (long fiber reinforcements) commonly prepared and sold as reinforcing materials for base resins include inorganic fibers such as glass fibers, carbon fibers, metal fibers and molten quartz fibers; and organic fibers such as synthetic resin fibers. All of these long fiber reinforcing materials F may preferably be used in the present invention in as much as they are in the form of substantially endless "long fibers". In this regard, however, the reinforcing material practically supplied is not a single fiber, but is in general "roving" formed by assembling a plurality of single fibers without twisting and adhering them to one another to a proper degree to give a bundle or a roving. It would be expected that this roving is opened into individual single fibers to a possible highest degree in the opening process.

The opened long fiber bundles F obtained by opening the roving are preferably dispersed in a base resin material (matrix) to an extent as uniform as possible. In addition thereto, if opened long fibrous materials are included in a long and narrow material such as reinforced strands or reinforced rods S, the fibrous materials are preferably arranged in parallel to an extent as high as possible with respect to the direction along the longitudinal axis thereof (machine directions).

Materials for Long Fiber Reinforcement

Any kind of long fiber reinforcing material F may be employed as materials for the production of the long fiber-reinforced continuous length section S according to the present invention. These materials may roughly be classified into inorganic and organic ones. Most practically useful ones among the inorganic materials are, for instance, glass (silicate glass), quartz, naturally occurring minerals, metals and carbon. In this connection, the term "glass" herein used means solid solutions mainly comprising metal silicate salts and specific examples thereof are soda glass, potash glass, and heat resistant glass such as borosilicate glass. Among various kinds of glass materials, preferred are potassium silicate type glass (potash glass) and borosilicate glass (also referred to as "E glass").

The glass is a most widely used reinforcing material among the long fiber reinforcing materials from the viewpoint of its excellent tensile characteristics, bending characteristics, thermal characteristics and its low cost, but the use thereof is restricted to the fields which require light weight characteristics and resistance to alkalis.

Glass Fiber Reinforcing Material FG

There can be listed glass rovings as continuous glass fiber bundle F representative of the long fiber reinforcing material (long glass fiber bundle) commonly produced and sold as reinforcement for the basic resin. This glass roving in general has an average fiber diameter ranging from 4 to 30 $\mu$m, a number of assembled filaments ranging from 400 to 10000 and a tex number of 300 to 20000 g/km and it preferably has an average fiber diameter ranging from 9 to 23 $\mu$m and a number of assembled filaments ranging from 1000 to 6000. Preferably, the surface of the long fiber reinforcing material is treated with, for instance, a silane coupling agent, which serves as a processing agent having an ability of imparting or improving interfacial adhesion from the viewpoint of the reinforcing effect for the basic resin.

A Organic Fiber Reinforcing Material FP

Carbon fibers FC may be replaced with the foregoing glass fiber reinforcing material FG because of its excellent light weight properties and resistance to alkalis. However, the price of the carbon fibers FC is not comparable to that of the glass fibers and therefore, the applications of carbon fibers FC are limited to such fields as aircrafts, motorcars for racing or products for sports, in which the light weight properties and the strength are prior to other factors such as price.

Organic materials mainly-comprise synthetic resins, which are roughly classified into thermosetting resins and thermoplastic resins.

Among these, the long fibers of thermosetting resins as materials for reinforcing materials F have quite high heat resistance and any thermoplastic resin cannot compare with the thermosetting resins in that respect, but the latter is far inferior to the former in respect of the molding characteristics. Among these thermoplastic resins, those having high crystallinity and a high melting point are quite favorable as long fiber reinforcing materials. In this respect, it is a matter of course that if a thermoplastic resin is used as a reinforcing material FP, it should have a melting point considerably higher than that of the base resin and usually at least 50° C. higher than and preferably at least 70° C. higher than the melting point of the base resin.

Such a thermoplastic resin having a high crystallinity and high melting point may be, for instance, a variety of polyamide resins or polyester resins such as those having a melting point higher than 200° C. for applications, which require high heat resistance. Specific examples of polyamide resins are ring-opening addition polymerized nylons such as 6-nylon, 7-nylon, 11-nylon and 12-nylon; copoly-condensed polyamide resins such as 6,6-nylon, 6,7-nylon, 6,10-nylon and 6,12-nylon; and widely used and specially designed products such as 6-/6,6-co-condensed nylon.

In applications, which require more higher heat resistance, aromatic polyamide resins, completely aromatic polyamide resins (also referred to as "aramid resins") or the like can be used. Typical examples of the former are those having common name of "nylon MXD6" or copoly-condensates of m-xylene with adipic acid and typical examples of the latter are copoly-condensates of m-xylylenediamine and terephthalic acid. Some of those belonging to the latter have already been put on the market.

In addition, most commonly used polyesters (resins) are copoly-condensates of aliphatic diols with aromatic dicarboxylic acids, with copoly-condensates ("polyethylene terephthalate"; abbreviated as "PET") of ethylene glycol (or "ethylene oxide") with terephthalic acid being preferred among others.

As polyesters having more higher heat resistance, there may be listed, for instance, copoly-condensates ("poly(1,4-butanediol terephthalate)"; abbreviated as "PBT") obtained using 1,4-butanediol in place of ethylene glycol as the aliphatic diol. Polyester resins particularly excellent in heat resistance are, for instance, aromatic copoly-condensates in which the diol component is also aromatic diol (common name: "completely aromatic polyester") and some of them are used as materials for bulletproof jackets.

Basic Resins (Substrate; Matrix)

The resin materials for the molten resins, which are used for impregnating the opened long fibrous materials (single fibers or products having a rather low degree of opening) obtained by opening long fiber bundles (rovings), are not restricted to specific thermoplastic resins inasmuch as they have a crystalline melting point generally ranging from 110 to 350° C. and preferably 150 to 270° C. In the usual applications, however, it is common to use, as such a resin material, at least one member selected from crystalline resins such as polyolefin resins, polyamide resins (nylon) and polyester resins or a combination of at least two of them. If using a combination of at least two thermoplastic resins, it is preferred that these resins are sufficiently compatible with one another.

Among the foregoing crystalline thermoplastic resins, polyolefinic resins PO are widely used for the usual applications from the viewpoint of the quality and price thereof. The term "polyolefin resins PO" herein used includes crystalline homopolymers or crystalline copolymers comprising, as monomers, α-olefins having in general about 2 to 10 carbon atoms, compositions (or mixtures) comprising at least two crystalline homopolymers, compositions (or mixtures) comprising at least two crystalline copolymers and compositions (or mixtures) comprising at least one crystalline homopolymer and at least one crystalline copolymer.

The term "α-olefins having in general about 2 to 10 carbon atoms" constituting the foregoing crystalline polyolefin resins herein used include, for instance, ethylene, propylene, 1-butene, 1-pentene, 1-hexene, 4-methyl-1-pentene, 1-octene and 1-decene, which may be present in the resins alone or in any combination.

Among the crystalline polyolefins (common name of "poly-α-olefins"), most widely used are crystalline polypropylene resins PP from the practical standpoint. In this connection, polyethylene resins are rather preferred in low temperature applications, while poly(4-methyl-1-pentene) resins MPT are preferably used in applications, which require high heat resistance. Incidentally, at least two of the foregoing crystalline polyolefin resins may, if necessary, appropriately be selected and combined with one another to give a resin composition showing characteristic properties peculiar thereto, which cannot be accomplished by any one of single resins.

The base resin constituting the thermoplastic resin continuous length sections S reinforced with long fibers F according to the present invention may be any thermoplastic resin inasmuch as the resin has a melt flow rate [MFR (230° C.; 21.2N)] ranging from 30 to 300 g/10 min and preferably 50 to 200 g/10 min.

Moreover, it is preferred to use the foregoing polyamide resins NL (nylon) or thermoplastic polyester resins as the base resins and at least one member selected from the group consisting of thermosetting resins or fibers of inorganic substances such as glass fibers FG (silicate glass fibers), asbestos fibers, quartz fibers, carbon fibers FC and metal fibers, as the long fiber reinforcing material F, for the applications requiring still higher heat resistance.

Materials and Surface Finishing for Shaping Nozzle (Shaping Die)

In the shaping nozzle 1 according to the present invention, the vertical angle (α) of the conical plane 11 of the nozzle viewed from the upstream side thereof, the inner diameter of the land portion 12, the wall surface or the like are reduced or worn out due to the friction between the shaping nozzle 1 and the highly hard fibers such as glass fibers F over a long period of time. To control the above wear, it is preferred that the material for the shaping nozzle 1 be selected from superhard alloys such as iron-tungsten alloys (trade name: Tungalloy) or iron-titanium (ferro-titanium) alloys and then subjected to a plating treatment (metal-plating treatment) with a metal capable of forming a film having excellent surface hardness such as chromium or nickel, preferably electrolytic plating (electro-plating) to thus make the surface more smoother. If it is desired that more higher surface hardness and surface smoothness should be imparted to the shaping nozzle 1, it is preferred to make the surface more smoother by, for instance, subjecting a shaping nozzle made of the foregoing superhard alloy or the like to electrolytic polishing.

As has been described above in detail, if a downstream end wall provided with the shaping nozzle having a specific shape according to the present invention is incorporated into an opening-impregnation bath and the length of the land portion perforated through the downstream end wall is set at a level specified (or selected) in the present invention, long fibers never undergo any breakage and fluffing during opening and this accordingly leads to the substantial reduction of pill-formation. As a result, the opening-impregnation device provided with the downstream end wall carrying the shaping nozzle (including the land portion) according to the present invention can stably and continuously be operated over a long period of time.

What is claimed is:

1. A pultrusion device for manufacturing a reinforced continuous length section prepared from a thermoplastic resin reinforced with long fiber reinforcements which comprises a shaping nozzle arranged with a conical portion connected to a cylindrical land portion subsequent to the upstream conical portion, which nozzle is equipped at least with a downstream end wall which comprises a vertical angle ($\alpha$) of an upstream conical surface of the upstream conical portion ranges from 15 to 35 degrees, a length of the land portion ranges from 1 to 5 mm and the length of the shaping nozzle on the central axis extending from the upstream end towards the downstream end of the nozzle ranges from 5 to 35 mm.

2. The vertical angle ($\alpha$) of the upstream conical surface of the conical portion, as set forth in claim 1, ranges from 20 to 35 degrees.

3. The length of the shaping nozzle, as set forth in claim 1, ranges from 15 to 30 mm.

4. The length of the shaping nozzle, as set forth in claim 2, ranges from 15 to 30 mm.

* * * * *